United States Patent [19]

Telle et al.

[11] Patent Number: 5,748,138

[45] Date of Patent: May 5, 1998

[54] SYNCHRONOUS IDENTIFICATION OF FRIENDLY TARGETS

[76] Inventors: John M. Telle, 126 Shady Oak Cir., Tijeras, N. Mex. 87059; Stutz A. Roger, 5 Kiowa La., Los Alamos, N. Mex. 87544

[21] Appl. No.: 724,119

[22] Filed: Sep. 30, 1996

[51] Int. Cl.[6] ................................................. G01S 13/78
[52] U.S. Cl. ........................... 342/45; 342/6; 342/13; 342/50; 342/57
[58] Field of Search ........................ 342/45, 6, 13, 342/50, 51, 53, 57, 60

[56] References Cited

U.S. PATENT DOCUMENTS

| | | | |
|---|---|---|---|
| 3,911,433 | 10/1975 | Redman | 342/33 |
| 5,001,488 | 3/1991 | Joguet | 342/45 |
| 5,142,288 | 8/1992 | Cleveland | 342/45 |
| 5,144,227 | 9/1992 | Cleveland, Jr. | 356/152 |
| 5,170,168 | 12/1992 | Roth | 342/45 |
| 5,202,783 | 4/1993 | Holland et al. | 359/152 |
| 5,274,379 | 12/1993 | Carbonneau | 342/45 |
| 5,299,227 | 3/1994 | Rose | 375/1 |
| 5,382,957 | 1/1995 | Blume | 342/43 |
| 5,396,243 | 3/1995 | Jalink | 342/54 |
| 5,583,507 | 12/1996 | D'Isepo et al. | 342/45 |

OTHER PUBLICATIONS

McGraw–Hill Encyclopedia of Science & Technology, 7th Ed., (c) 1992, pp. 353–355, 669.
Thermal Radiation Shields, (Hia et al., 63 Am. J. Puys. 1041 (Nov. 1995).
Planck's Constant Determination, Brizuela et al., 64 Am. J. Puys. 819 (Jun. 1996).
The Power Law Thermal Model, Del Grande, Lawrence Livermore Lab. Oct. 30, 1979.

*Primary Examiner*—John B. Sotomayor
*Attorney, Agent, or Firm*—Kevin Lynn Wildenstein

[57] ABSTRACT

A synchronous communication targeting system for use in battle. The present invention includes a transceiver having a stabilizing oscillator, a synchronous amplifier and an omni-directional receiver, all in electrical communication with each other. A remotely located beacon is attached to a blackbody radiation source and has an amplitude modulator in electrical communication with a optical source. The beacon's amplitude modulator is set so that the optical source transmits radiation frequency at approximately the same or lower amplitude than that of the blackbody radiation source to which the beacon is attached. The receiver from the transceiver is adapted to receive frequencies approximately at or below blackbody radiation signals and sends such signals to the synchronous amplifier. The synchronous amplifier then rectifies and amplifies those signals which correspond to the predetermined frequency to therefore identify whether the blackbody radiation source is friendly or not.

20 Claims, 2 Drawing Sheets

SYNCHRONOUS IDENTIFICATION OF FRIENDLY TARGETS

FIELD OF THE INVENTION

The identification of friend or foe ("IFF") target means of the present invention relates to synchronous communication for IFF applications that includes a transceiver adapted to remotely communicate with a beacon. The beacon is a lightweight, battery operated device having a radiating source, and can be placed on any person, place or thing that radiates heat (such as a soldier) due to the blackbody effect. The transceiver includes a small, rugged lightweight oscillator, synchronous amplifier and receiver. The present invention masks or hides communication signal transmissions in electromagnetic frequency bands (where such frequencies are present on the battlefield) preferably infrared frequency bands within or below the range of frequencies determined by the radiating source.

BACKGROUND OF THE INVENTION

The need to identify friendly forces or enemy targets is especially urgent during times of war. This need was particularly exemplified by the recent United States operative labeled "Operation Desert Storm." Identification of friendly forces, however, is difficult to achieve in light of the number of persons on a battlefield (from both the enemy and the friendly forces), transport vehicles on the battlefield, the number of mines or field, bombs which may have been planted by the enemy and also the possibility of an air or sea attack. While technology exists to confirm the presence of a friendly target when a physical (or direct line) sighting of such target occurs, the continued development of "smart weapon systems" have virtually mitigated the need to have such physical sightings. As technology advances, the need for an efficient and reliable identification system which cannot be detected by enemy forces increases.

As identified in U.S. Pat. No. 5,396,243, U.S. air forces already have a somewhat effective solution for identifying friendly targets in air-to-air and ground-to-air combat for at least two reasons. First, the nature of air combat requires long-range weaponry which makes the identification problem critical for anti-air targeting. Second, the cost of airborne platforms has generally been sufficiently high to justify the additional expense of incorporating "Identification Friend or Foe" systems on such platforms in order to minimize loss of valuable assets.

Numerous prior art target identification systems exist. For example, such systems are disclosed in U.S. Pat. Nos. 5,299,227 to Rose, 5,396,243 to Jalink et al., 5,001,488 to Joguet, 5,274,379 to Carbonneau et al., 5,170,168 to Roth and 5,202,783 to Holland et al. As disclosed in the prior art, there are various methods employed to provide a friendly identification targeting system.

Despite the numerous methods available for IFF identification, the prior art has never attempted to rely on electrical signal characteristics and the blackbody radiation effect to provide an IFF targeting system. As is known in the art, a blackbody is defined as a body which can absorb all incident radiation and reflect none. When the body absorbs such radiation (such as, for example, radiation emitted by the sun), the body in turn emits the maximum amount of radiant energy (such as heat) from its surface at a proportional frequency. The radiant energy is in the form of electromagnetic waves and could cover a wide range of the electromagnetic spectrum. For example, if an electric stove is turned on, the stove's electric elements will first glow red. As more power is applied to the stove's elements, they will then turn to white and possibly blue. This change in color represents the frequency distribution of radiation emitted by a body which gets hotter (or cooler) with temperature. The emission of radiant energy from a blackbody radiation source is expressed by the Stefan-Boltzmann law, the spectral energy distribution can be described by Planck's equation and the maximum amount of energy radiated in any wavelength interval is dictated by Kirchoff's law. by the enemy. The device should be portable, yet lightweight, providing for case of transportation both by persons and vehicles. The system should be capable of ease of modification (such as modification of frequency) such that the enemy cannot easily identify, determine or estimate the system's operating characteristics (such as, for example, its operating frequencies). The effective system must be reliable and be able to function under a variety of conditions. Finally, a preferred system should decrease a person's (or, a vehicle's) vulnerability from identification from an enemy force. The present invention encompasses these characteristics.

The present invention provides a unique and novel approach to IFF targeting systems by locating remote beacon radiation signals, the beacon's transmitted radiation signals at a predetermined frequency and the beacon's transmitted frequencies which are below the frequency levels of a blackbody radiation source to which the beacon is attached. Because the present invention employs optical radiation having a much shorter wavelength than radio waves, it is capable of high spatial resolution and can therefore discriminate between targets as well as any target acquisition system.

In view of the foregoing, it is an object of the present invention to provide a identification of friend or for target means having a transceiver and a receiver, the transceiver and receiver being remotely located from each other, the beacon adapted to transmit radiation frequencies approximately at or lower than an adjacent radiating source and the transceiver adapted to receive the beacon's frequency, modulate the frequency and identify whether the target is friend or foe.

It is also an object of the invention to provide a device which is not subject to enemy duplication or identification.

It is also an object of the invention to provide a device capable of friendly target recognition that is undetectable by conventional detection methods.

It is a further object of the invention to provide a means of using natural and man made "noise" in various spectral frequencies as a means of concealing information and the transmission of information.

It is a further object of the invention to provide a identification targeting means which masks or hides communication signal transmission in electromagnetic frequency bands within or below the range of frequencies generated by a radiating source.

It is another object of the invention to provide a device having a beacon and a transceiver, the beacon being attached to or carried by a radiating source, the beacon relying upon the effects of blackbody radiation to mask transmitted communication signals in certain electromagnetic frequency bands, the second portion being adapted to receive and analyze the beacon's transmission to identify whether a target is a friendly force.

It is further object of the present invention to provide an individual identification of friend or for target means having a transceiver and a receiver, the transceiver and receiver being remotely located from each other but being in communication with each other at ranges up to 2 Km.

SUMMARY OF THE INVENTION

The present invention is a synchronous communication targeting system for use in battle. The present invention includes a beacon and a transceiver, the transceiver adapted to transmit a synchronous signal, receive a signal from the remote beacon which is sent at a predetermined frequency, and then evaluate whether the predetermined frequency transmission correspond to a friendly force.

The present invention includes a transceiver and a remotely located beacon. The transceiver includes a stabilizing oscillator, a synchronous amplifier and an omnidirectional receiver, all in communication with each other. The beacon includes an amplitude modulator in electrical communication with a optical source. The beacon's amplitude modulator is set so that the optical source transmits radiation frequency at approximately the same or lower amplitude than the blackbody radiation source to which the beacon is attached. The receiver from the transceiver is primarily adapted to receive frequencies approximately at or below surrounding blackbody radiation signals and sends such signals to the synchronous amplifier. The synchronous amplifier then rectifies and amplifies those signals which correspond to the predetermined frequency to therefore identify whether the blackbody radiation source is friendly or not.

DESCRIPTION OF THE PREFERRED EMBODIMENT

The preferred embodiment of the present invention includes two main components: (a) beacon 10; and (b) transceiver 20.

Figure 1:
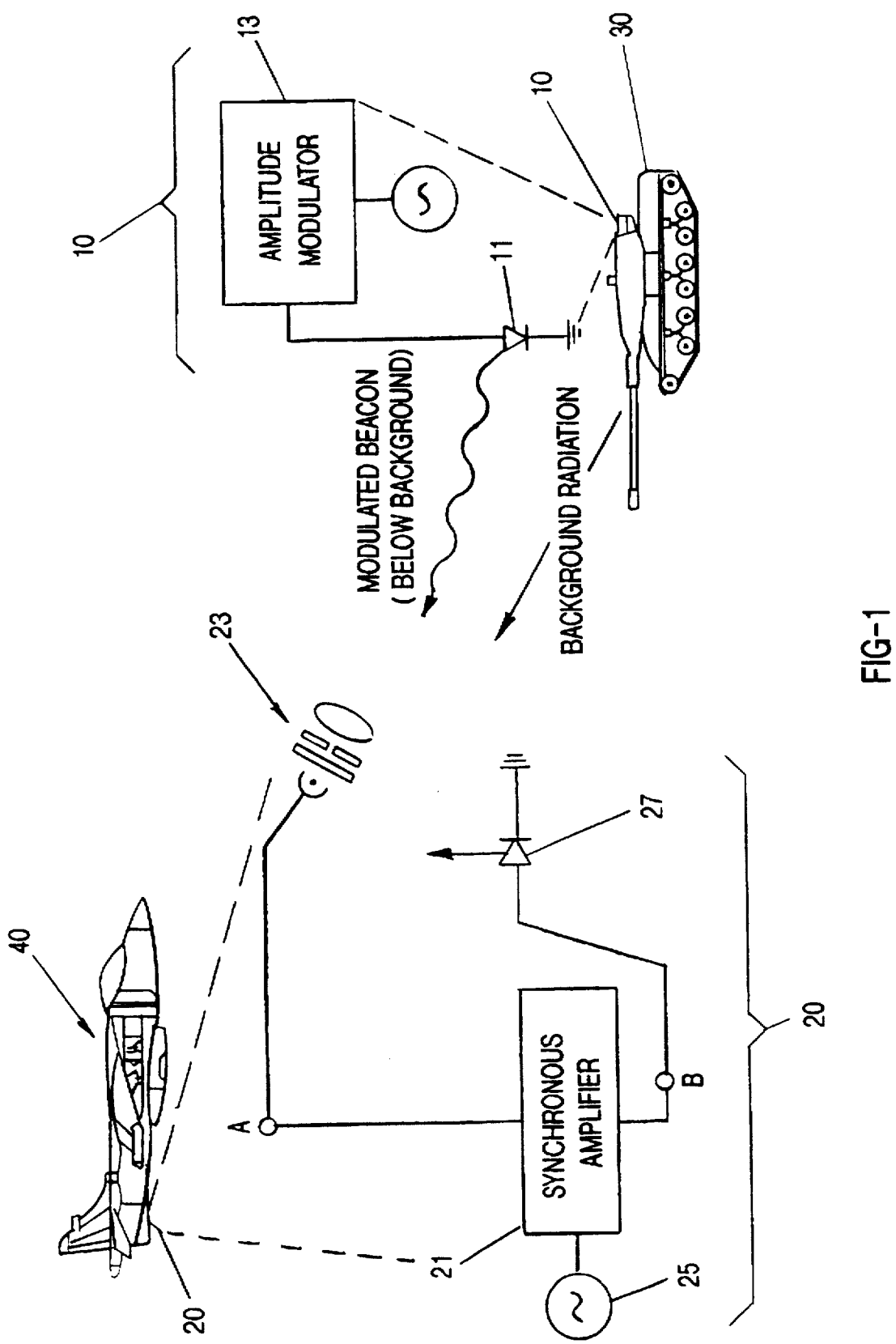
FIG. 1 illustrates the preferred embodiment according to the present invention.

As generally seen in FIG. 1, beacon 10 includes amplitude modulator 13 and radiating source 11, both preferably enclosed in the same housing. Optimally, radiating source 11 is an internally powered small optical source adapted to emit radiation in all directions, and is preferably adapted to attach to (or be carried by) a friendly target which emits blackbody radiation. By way of illustration, but not by means of limitation, radiating source 11 could be a $CO_2$ laser as its output (10 µm) is near the peak of most blackbody radiation (such as tank 30) operating in a normal battlefield temperatures. Further, such friendly targets include, among other things, persons, vehicles, aircraft, seacraft, various fielded target acquisition systems or anything that emits blackbody radiation.

Beacon 10 is adjusted to emit radiation at a lower predetermined frequency ($F_1$) than the blackbody radiation emitted (F) from the friendly target to which it is attached, and preferably, is capable of emission transmission of great distance (such as up to seven kilometers). This predetermined lower frequency $F_1$ or frequencies is amplitude modulated by modulator 13. Any predetermined frequency $F_1$ could be selected, and could be changed rapidly by, for example, the use of encrypted pulses from a satellite or some other similar transmitter. Preferably, beacon 10 is designed to operate at any invisible wavelength or below background noise levels. It is believed that beacon 10 would operate even at low modulation frequencies (approximately one kilohertz), where an optical source such as a $CO_2$ laser can be modulated directly.

Transceiver 20 includes synchronous amplifier 21 and omnidirectional receiver 23. Receiver 23 is primarily adapted to locate and receive blackbody radiation signals from a blackbody radiation source (such as source 11 attached to tank 30 as seen in FIG. 1), but can also receive other background radiation frequencies. As such, receiver 23 will receive the modulated signal from beacon 10. Transceiver 20 further includes stabilizing oscillator 25 in electrical communication with synchronous amplifier 21, both being set at the same predetermined frequency. While all transmitters of frequency are "beacons" to any detection system, those skilled in the art will now come to understand that the present invention's transceiver, operating at a predetermined frequency, is completely invisible to detectors operating without a synchronous amplifier, or even if such detectors employ a synchronous amplifier, they must also attempt to locate the predetermined frequency, a task which is time consuming and almost impossible given the wide range of frequencies available.

Figure 2:
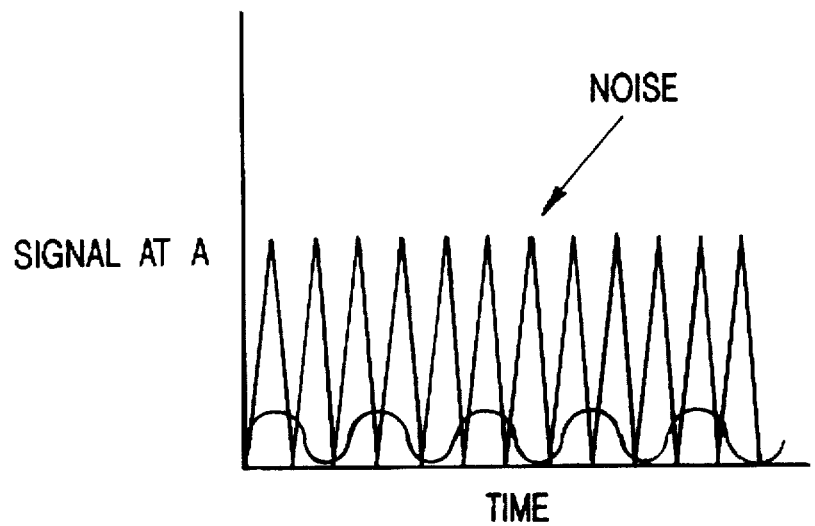
FIG. 2 is a graphical illustration depicting the electrical signal received by the transceiver of the present invention.
Figure 3:
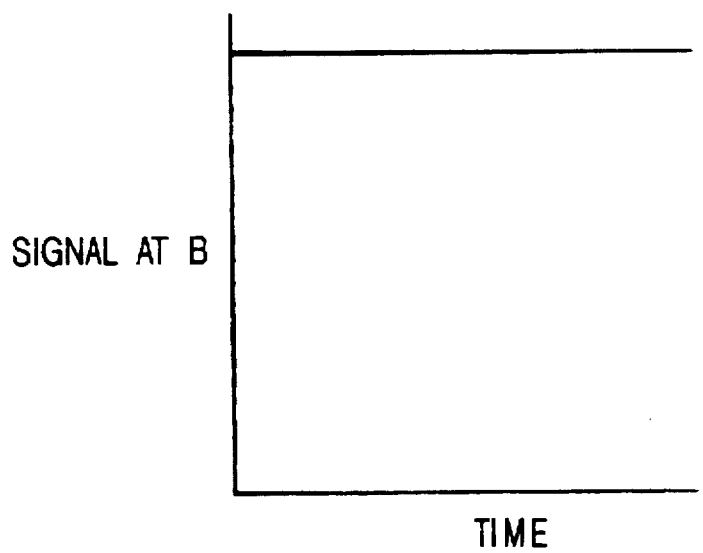
FIG. 3 is a graphical illustration depicting the electrical signal of FIG. 2 after the signal is processed by the synchronous amplifier of the present invention.

Synchronous amplifier 21 is preferably a two phase amplifier. The combination of the stabilizing oscillator 25 and synchronous amplifier 21 is designed to rectify and amplify only those alternating current signals which correspond to the predetermined frequency $F_1$. As seen in FIGS. 1 and 2, the signal received by receiver at point A is graphically represented in FIG. 2. In this fashion, any receiver (including an enemy's receiver) will view the signal received as "noise" having variable frequencies and amplitudes. However, when this signal is processed by synchronous amplifier 21, the signal received now becomes a steady state signal (as seen in FIG. 3) if a friendly force is targeted. Conversely, if no friendly force is targeted, no steady state signal will be received. The signal received can carry information phased on modulated.

Optionally, if desired, the direct current signal created from the alternating current signal from synchronous amplifier 21 could be used to drive a visible source (such as a photodiode 27 as seen in FIG. 1), to thereby flag the friendly target.

In operation, for example, and with reference to FIG. 1, tank 30 has attached beacon 10, including diode laser 11 whose output is modulated by amplitude modulator 13.

Tank 30 is also radiating blackbody radiation frequencies due to the heat emitted from any one of its surfaces. Diode laser 11 is set at its average power frequency $F_1$ such that it is approximately at, or preferably below, tank 30's blackbody radiation frequency. The modulation frequency of diode laser 11 remains secret, thereby mitigating or eliminating location of tank 30 by the enemy. A friendly force will employ transceiver 20 from a distance (such as from an aircraft, as seen in FIG. 1), which is already set to detect predetermined frequency $F_1$ from beacon 10. By employing synchronous detection, one can often see modulated signals which are 10 to 100 times weaker than the surrounding background signals or "average noise" power of the detection system. Therefore, the friendly forces operating transceiver 20 can detect the weak modulated emission from beacon 10 (despite any additional noise in the battlefield as might radiate from other tanks, other persons or the like). As those skilled in the art will appreciate, enemy forces will find it very difficult, if not impossible, to detect tank 30 because their detection system's noise power output will swamp or overcome the beacon's signal.

In many cases, it may be desirable or necessary to provide both a transceiver 20 and a beacon 10 on the same blackbody radiation source. For example, the present invention can include a transceiver and a beacon on an asset of any appreciable value (such as a jet helicopter or attack fighter airplane). Prior to engaging in battle, the operators of the asset can therefore determine whether or not friendly forces exist in the area while at the same time radiating a signal from the beacon to let others (who have a similar transceiver/beacon set up, such as a second transceiver and a second beacon) simultaneously know of the asset's presence. As such, it is clear that by employing both a transceiver and a beacon on the same blackbody radiation source, all such sources similarly equipped will be able to communicate with and/or identify each other. Therefore, those skilled in the art will appreciate that the present invention can be employed on a variety of objects to achieve ground-to-ground, air-to-ground, ground-to-air or air-to-air target identification.

As those skilled in the art will also come to realize, beacon 10 can be placed on anything that emits blackbody radiation. While the beacon, in it preferred mode, is normally attached to a friendly target, beacon 10 can also be attached to an enemy target if desired. In this fashion, if the operator knows that the beacon is attached to an enemy target, the operator will be able to obtain the necessary location and/or movement of the enemy target to survey its direction, and/ or possibly to assist in the termination of the enemy target.

Those of skill in the art will now recognize the advantages of the present invention. For example, no hand shake or security key is required between the transceiver and the beacon. Further, neither the transmitter's operator nor the holder of the beacon have to compromise their respective positions in order to make the communication link. With the present invention, every friendly target can detect every other friendly target, while no friendly target can be detected by an enemy. Moreover, because of the nature of the frequency emitted from beacon's 10 optical source 11, it cannot be seen with the naked eye. It is clear that the present invention saves time and resources, as it allows the operator to quickly determine friendly targets, thereby providing the operator additional time to focus on enemy targets. Finally, as those skilled in the art will appreciate, the present invention is effective either during nighttime or daytime conditions and even under most adverse weather conditions.

Whereas the drawings and accompanying description have shown and described the preferred embodiment of the present invention, it should be apparent to those skilled in the art that various changes may be made in the form of the inventions disclosed without affecting the scope thereof.

I claim:

1. An identification of friend or foe targeting means comprising:

(a) a transceiver; and
   (b) a remotely located beacon attached to a blackbody radiation source, the beacon comprising a radiating source in electrical communication with an amplitude modulator and a power source, the amplitude modulator, the radiating source and the power source within and secured to a compact housing, the radiating means adapted to transmit radiation at a predetermined frequency approximately equal to or less than the frequency generated by the blackbody radiation source to send and receive masked transmitted communication signals within the frequency generated by the blackbody radiation source.

2. The identification of friend or foe targeting means according to claim 1 wherein the transceiver further includes a stabilizing oscillator, a synchronous amplifier and a receiver, all in electrical communication with each other, the stabilizing oscillator and the synchronous amplifier adapted to rectify and amplify the same frequency as the predetermined frequency emitted from the radiating source.

3. The identification of friend or foe targeting means according to claim 1 wherein the radiating source is adapted to transmit radiation at an invisible wavelength.

4. The identification of friend or foe targeting means according to claim 2 wherein the radiating source is adapted to transmit radiation at a predetermined frequency less than the blackbody radiation source and at modulation frequencies less than five kilohertz.

5. The identification of friend or foe targeting means according to claim 2 wherein the radiating source is a $CO_2$ laser diode.

6. The identification of friend or foe targeting means according to claim 2 wherein the radiating source is capable of transmitting radiation up to seven kilometers.

7. The identification of friend or foe targeting means according to claim 2 wherein the amplitude modulator is adapted to receive communications from a remote satellite source.

8. The identification of friend or foe targeting means according to claim 2 wherein the receiver is adapted to receive frequency signals from any direction.

9. The identification of friend or foe targeting means according to claim 8 wherein the receiver receives blackbody radiation signals emitted from the blackbody radiation source.

10. The identification of friend or foe targeting means according to claim 2 wherein the synchronous amplifier is a two phase amplifier.

11. The identification of friend or foe targeting means according to claim 1 further including a visible source, and wherein the synchronous amplifier is in electrical communication with the visible source.

12. The identification of friend or foe targeting means according to claim 11 wherein the visible source is a light emitting diode.

13. A system for identifying friendly targets, the system, in combination, comprising a first transceiver and an adjacent beacon attached to the same blackbody radiation source, the beacon comprising a radiating source in electrical communication with an amplitude modulator and a power source, the radiating means adapted to transmit radiation to a remotely located second transceiver at a predetermined frequency approximately equal to or less than the frequency generated by the blackbody radiation source, the beacon and the transceiver sending and receiving hidden communication signals approximately within or below the frequency generated by the blackbody radiation source.

14. The system according to claim 13 wherein the first transceiver further includes a stabilizing oscillator, a synchronous amplifier and a receiver, all in electrical communication with each other, the stabilizing oscillator and the synchronous amplifier adapted to rectify and amplify the same frequency as the predetermined frequency emitted from the radiating source.

15. The system according to claim 14 wherein the radiating source is a CO2 laser diode.

16. The system according to claim 15 wherein the amplitude modulator is adapted to receive communications from a remote satellite source.

17. The system according to claim 16 wherein the receiver is adapted to receive frequency signals from any direction.

18. A device for the identification of remote communication signals comprising:

(a) omnidirectional means attached to a blackbody radiating source for transmitting communication signals at predetermined frequencies, the predetermined frequencies being approximately at or less than the frequency emitted by the blackbody radiation source; and (b) a transceiver, the transceiver including a stabilizing oscillator, a synchronous amplifier and a receiver, all in electrical communication with each other, the stabilizing oscillator and the synchronous amplifier adapted to rectify and amplify the same frequency as the predetermined frequencies emitted from the omnidirectional means for transmitting.

19. The device according to claim 18 wherein the amplitude modulator is adapted to receive communications from a remote satellite source.

20. The system according to claim 19 wherein the omnidirectional means for transmitting includes a $CO_2$ laser diode, an amplitude modulator and a power source, all in electrical communication with each other.

* * * * *